United States Patent [19]

Porchet

[11] 4,418,439
[45] Dec. 6, 1983

[54] CURVED GLASS ICE-SCRAPER

[76] Inventor: Marcel Porchet, 2265 Brebeuf St., Apt. 9, Longueuil, Canada, J4J 3P9

[21] Appl. No.: 344,887

[22] Filed: Jan. 29, 1982

[30] Foreign Application Priority Data

Jun. 25, 1981 [CA] Canada ................................. 380604

[51] Int. Cl.³ .......................... B60S 1/04; A47L 1/06
[52] U.S. Cl. .................................... 15/236 R; 30/169
[58] Field of Search ................. 15/104 S, 236 R, 245, 15/105, 111; 30/169, 171, 334, 335

[56] References Cited

U.S. PATENT DOCUMENTS

| | | | |
|---|---|---|---|
| 1,264,350 | 4/1918 | Unsinger | 30/169 |
| 1,744,909 | 1/1930 | Magnusson | 30/169 X |
| 2,265,551 | 12/1941 | Steccone | 15/236 R X |
| 3,201,867 | 8/1965 | Case | 30/169 |

Primary Examiner—Edward L. Roberts

[57] ABSTRACT

An ice-scraper used to scrape off ice and frost formed on the outer convex glass surface of a vehicle windshield. This ice-scraper consists of a one-piece triangular shape body made of precast flexible and resilient plastic material. The base edge of said body is bevelled to form a scraping edge. The body has a slit extending parallel to this base edge and terminating short of the side edges of the body to define a flexible blade portion adapted to contact a convex glass surface over substantially the entire length of the scraping edge.

2 Claims, 1 Drawing Figure

CURVED GLASS ICE-SCRAPER

FIELD OF THE INVENTION

This invention relates to an ice-scraper of the type used by vehicle drivers to scrape off ice and frost formed on the windshield or other glass of their vehicle.

DESCRIPTION OF THE PRIOR ART

In the ice-scrapers of the above type that are known in the prior art, the scraping is produced by a blade which is made rigid. Thus, such rigid blade has a scraping edge of fixed outline most generally forming a straight line. Such scrapers were suitable for vehicles of earlier years, since their windshield and other glasses were flat or of very little curvature and the rigid scraping edges were thus making substantially full length contact with such earlier glasses. Present-day vehicles, however, are manufactured with curved glasses and they cannot as easily be scraped with rigid scraping blades, since they generally do not make full length contact due to the curvature. Thus, relatively narrower bands are scraped at the time. It results that such rigid scraping blades do not produce a good cleaning of curved glasses and require more time for a given surface.

OBJECTS OF THE INVENTION

It is a general object of the present invention to provide an ice-scraper of the above type, which avoids the above-mentioned disadvantages associated with scraping of curved glasses.

It is an object of the present invention to provide an ice-scraper of the above type, which includes a flexible scraping blade constructed and arranged such that its scraping edge makes substantially full length contact with a curved glass against which it is operatively applied.

It is another object of the present invention to provide an ice-scraper of the above type, which includes a flexible scraping blade and still which remains of simple and inexpensive construction.

It is a further object of the present invention to provide an ice-scraper of the above type, which includes a flexible scraping blade constructed and arranged such that its scraping edge makes substantially full length contact with a curved glass surface of convex curvature.

SUMMARY OF THE INVENTION

The ice-scraper comprises a body of flat triangular shape, made of a cast one-piece flexible and resilient plastic material and having a straight base edge and an opposite apex portion and converging side edges. The straight base edge is bevelled to form a scraping edge and the body has a slit parallel to said base edge and located intermediate the same and said apex portion. The slit terminates short of and at substantially an equal distance from the respective side edges. A separate handle is rigidly secured to the apex portion and extends away from the body and generally perpendicular to the base edge.

BRIEF DESCRIPTION OF THE DRAWINGS

The above and other objects and advantages of the present invention will be better understood with reference to the following detailed description of preferred embodiments thereof which are illustrated, by way of example, in the accompanying drawings, in which.

DESCRIPTION OF THE PREFERRED EMBODIMENT

Figure 1:
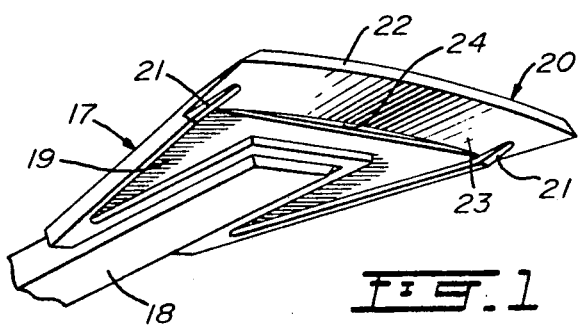
FIG. 1 is a perspective view of an ice-scraper according to the present invention.

The ice-scraper is generally indicated at 17 and comprises a body 20 and a separate handle 18 rigidly secured to the body 20. The body 20 has a flat isosceles triangular shape and is made of a cast or molded one-piece flexible and resilient plastic material. The body 20 has a straight base edge which is bevelled, as shown at 22, to form a scraping edge. The converging side edges of the triangular body 20 are defined by reinforcing ribs 21. The apex portion of the body which is disposed opposite to the bevelled base edge 22 forms a shank portion 19 adapted to be rigidly secured to the handle 18, which is a separate piece. This handle 18 is generally straight and rigid and extends substantially perpendicular to the base edge 22 and in the plane of the flat triangular body 20. It has a forked end to frictionally receive the shank portion 19.

In accordance with the invention, a slit 24 is formed through the body 20 and is arranged parallel to the base edge 22, but terminates short of and at an equal distance from the respective side edges. In practice, the ends of the slit 24 terminate at the inside surface of the ribs 21. This slit 24 defines therefore a blade portion 23 intermediate the slit and the base edge 22, which is integrally connected to the shank portion 19 solely beyond the ends of the slit. Therefore, the blade portion 23 can flex longitudinally to conform to a convex glass surface of a vehicle glass window. The body 20 being made of one-piece molded or cast plastic material, is simple and inexpensive to manufacture.

What I claim is:

1. An ice-scraper for the outer convex surface of a vehicle window, comprising a body of flat triangular shape and made of a cast one-piece flexible and resilient plastic material, said body having a straight base edge, an opposite apex portion and converging side edges, said straight base edge bevelled to form a scraping edge, said body having a slit parallel to said base edge and located intermediate said base edge and said apex portion, said slit terminating short of and at a generally equal distance from the respective side edges, the part of said body lying between said slit and said base edge forming a blade portion, and the part of said body extending from said slit towards and including said apex portion forming a shank portion, said base portion being integrally connected to said shank portion solely beyond the ends of said slit, whereby said blade portion can flex in a direction parallel to said base edge when applied against a convex window surface by pressure applied on the ends of said blade portion through said shank portion, and a separate handle rigidly secured to said shank portion, extending away from said body and generally perpendicular to said base edge.

2. An ice-scraper as defined in claim 1, wherein said side edges are formed with reinforcing ribs, said slit terminating at the inside surface of said ribs.

* * * * *